April 7, 1970  L. R. SPERBERG  3,504,724
RADIAL TIRE CONSTRUCTION
Original Filed Oct. 24, 1965
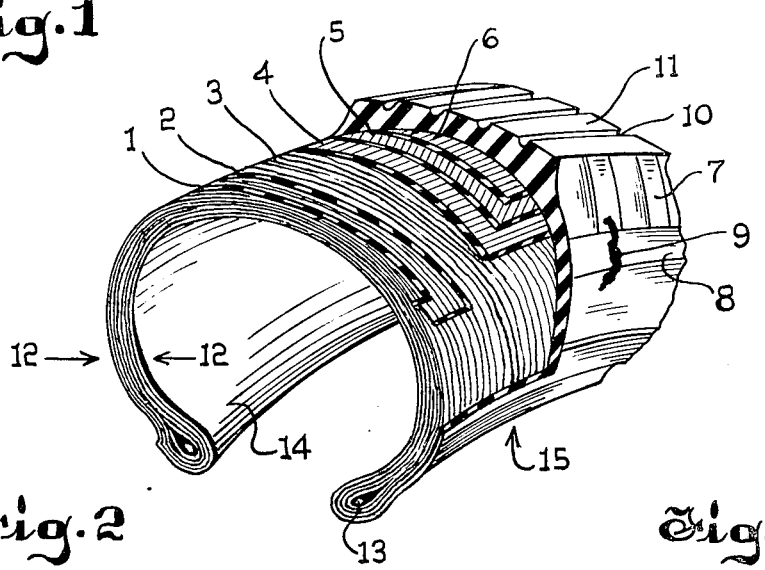
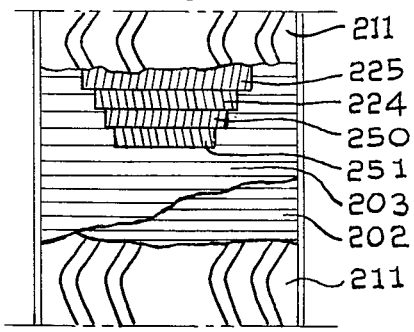
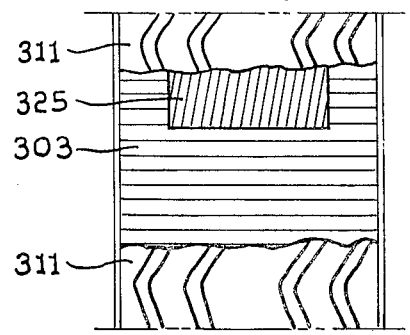
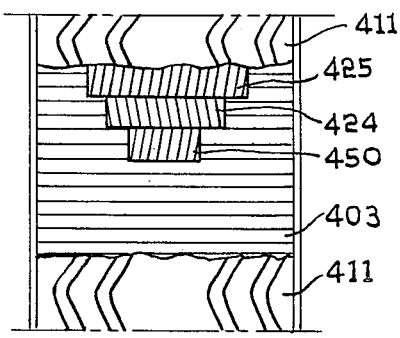
INVENTOR
LAWRENCE R. SPERBERG United States Patent Office 3,504,724
Patented Apr. 7, 1970

3,504,724
RADIAL TIRE CONSTRUCTION
Lawrence R. Sperberg, Box 12308,
El Paso, Tex. 79912
Continuation of application Ser. No. 504,424, Oct. 24,
1965. This application May 8, 1968, Ser. No. 727,751
Int. Cl. B60c 9/08, 9/20
U.S. Cl. 152—354                                    8 Claims

ABSTRACT OF THE DISCLOSURE

An improved radial ply constructed tire, in which a relatively nonextensible textile or ply material, such as steel or fiber glass, is used in the radial plies, while a more extensible textile, such as rayon or nylon is used in the belt plies. This construction takes advantage of the characteristics of tire cord material by placing a non-extensible or very low extensible ply material on the inside plies, and a somewhat higher extensible high impact energy material on the outside plies.

RELATED PATENT APPLICATION

This is a continuation of patent application Ser. No. 504,424, filed Oct. 24, 1965, and now abandoned.

Radial ply tires, both truck and passenger types, have been produced for many years in Europe, where the vehicles are small and the occupant's taste and riding habits differ from those of the U.S.A. The power capabilities of the European vehicle are much lower than those of the United States. The radial tires of the prior art offer many advantages over the conventional or biased constructed tire, including an improvement of upwards to twice the tread life, substantial increased gas mileage or lower horsepower consumption, increased puncturing resistance, and reduced nibbling. On the other hand, the radial tire is more difficult to manufacture, causes higher noise levels, and gives a less confortable ride. The handling characteristics of the tire differ from the conventional tire in that abrupt transtions occur at certain speeds.

In a radial ply tire the carcass cords run 90° to the circumferential center line and support a belt or breaker ply about the outer periphery of the radial plies. The plies of the belt are fabricated of cords at a very low angle (10° to 20°) to each other. The radial ply construction causes the tire to have a low spring rate while the belt improves the directional stability. The belt also provides for increased harshness, or poor riding characteristics and high noise level in the vehicle, since the impact energy produced by roughness in the road is largely transmitted directly into the vehicle.

A radial tire, in contrast to a conventional or bias constructed tire, does not shorten at the periphery but instead comes into contact with the ground in a manner similar to that of a tractor tract which eliminates tread scrubbing.

The presently available radial ply tire is fabricated using steel in both the radial plies as well as in the belt; or alternatively, using nylon or rayon as the ply textile while retaining steel in the belt. The extensive use of steel in the belt prevails throughout the industry, particularly in truck tires. In passenger tires low extensible rayon has been widely used in the belt construction, with low extensible materials being used in the radial plies. It is the general thought, however, that a textile such as nylon cannot be used in the belt, or for that matter in the radial plies, because of its greater growth characteristics in comparison to rayon or steel.

The major problem that the automotive tire industry will be confronted with as the use of the presently available radial tires becomes more widespread in high power vehicles will be the development of radial cracks in the lower buttress area. When these cracks penetrate through the tire body the tire is rendered useless. This type of failure is literally unknown in Europe, even in the truck tire field, because the above mentioned low power equipment that presently utilizes the current radial tire fails to exert enough torque to cause tires to fail for this reason. Since the American automobile carries up to 430 cu. in. displacement and the American trucks often exceed 350 H.P., the present radial tire configuration cannot be successfully operated because of the high mortality rate brought about by the radial cracks. Thus this weakness can overcome all of the other advantages associated with this remarkable tire.

Another common and prevalent type of failure that occurs when radial tires are placed in service on highly powered equipment is the more rapid development of separation between the plies of the steel belt that encompasses the radial plies. Steel tire cord has a very poor adhesive strength ranging from one half to one third of other commercially acceptable tire cord materials. This adhesion defect is aggravated by the increased sheer developed in traction when using high powered equipment and separations in the belt construction result when the force transmitted by the radial cords, and thence to the belt plies becomes intolerable to the belt ply rubber insulating material.

It is an object of the present invention to provide a novel radial tire that overcomes sidewall radial crack growth and belt ply separation.

Another object of this invention is to provide a novel radial tire construction that reduces the noise level in the vehicle, and improves the handling characteristics from the operator's viewpoint.

Another object of this invention is to provide an all nylon textile radial ply construction tire.

Still another object of this invention is to provide a tire construction having improved traction, reasonably low permanent set, and high resistance to sidewall radial cracking.

Other objects of this invention will become apparent from studying the entire disclosure.

FIGURE 1 shows a perspective view of a radial tire with parts broken away to more clearly illustrate the radial and belt plies.

FIGURES 2, 3 and 4 are diagrammatical representations of various ply structures.

Looking now in detail to FIGURE 1 in the drawing, there is seen a radial tire 15 having inside radial ply 1, second radial ply 2, and outside radial ply 3. Adjacent to the outside ply 3 is a cushion 4 that separate the radial from the belt plies and adjacent to this cushion is inside belt ply 5 and outside belt ply 6, sometimes also called the breaker plies 5 and 6. At buttress 7 and buffing rib 8 there is seen a radial crack or defect 9. Number 10 is the tread groove, while numeral 11 represents a tread rib. The tire body or tire thickness is indicated by arrows 12 and the bead wire by numeral 13. Arrow 14 indicates the inside of the tire 15.

A structurally perfect tire, so far as concerns the tire cord, is deemed one that has low elongation under load, excellent adhesive power, high impact energy, excellent bending life, low bending stiffness, low heat growth, high moisture resistance, and low tendency towards fusion. No known material exhibits all of these desirable properties, however, applicant has devised a novel construction which will enable fabrication of a tire that, as an end result, embraces these heretofore unattainable attributes.

Of the known tire cord materials, steel, rayon including the extra high modulus rayon, fiber glass, polyesters, and the polyamides have achieved the most prominence. Steel tire cord, while possessing high tensile strength, low elongation and low heat growth, is deficient in adhesive strength and has a very low impact energy coupled with a relatively low bending life and high bending stiffness.

Polyamide tire cord conversely has high elongation (or low modulus) in comparison to steel, high adhesive strength, high impact energy, high bending life, and low bending stiffness. It also has a high tensile strength which, while not as high as steel, appears to be adequate.

Glass fiber tire cord resembles steel quite closely in its inherent properties of tensile strength, low elongation, low heat growth, low adhesive strength and low impact energy but has a much lower density than steel and much greater flexibility with higher bending life.

Polyester fiber cords approach or equal polyamide cords in impact energy and tensile strength, but are stiffer, have a lower bending life, generally poorer adhesion strength and higher modulus, i.e., lower extension under constant applied load.

Polyolefins and polyesters, as reinforcing textiles, in addition offer low cost and good moisture resistance to the tire carcass. All of the polyolefins, except for polypropylene, have high melting points approaching that of nylon while polyester exceeds the melting point of nylon. Adhesion failure, such as found in fiber glass and steel, is one of the undesirable features associated with these two textiles.

Rayon tire cords are noted for their low growth characteristics and lie between steel and nylon in most of the identifying properties mentioned above. Rayon is used in the below examples as being an exemplification of the materials of consrtuction suitable for the inside plies.

Ordinary rayon, polyester, and the polyolefins fall in between the properties outlined above for the inner and outer plies, and hence find utility as the plies adjoining either of the above materials, or the central plies.

In this respect, it should be noted that the requirement for low elongation in the belt ply material is not deemed of prime importance in this novel construction. While this is a departure from the present accepted tire manufacturing technique, it is nevertheless considered of secondary importance in the selection of a belt ply material since the outside ply can grow no more than is permitted by the growth of the inside ply material; hence, the requirement of low elongation or low growth rate is shifted to the radial plies which results in a lowering of the criticality of elongation of the belt plies. Placing an extensible material, such as nylon, on the exterior belt plies where it is free to elongate, and a non-extensible material on the inside radial plies whereby it cannot elongate, results in a tire having low growth characteristics, improved traction under side thrust, and higher resistance to cracking and separation. Since nylon also resists the effects of moisture and shock while rayon, polyester, and fiber glass have low elongation under load and resist the effects of high temperature, one embodiment of the present novel tire is construction using rayon cord on the inside plies, polyester on the central plies, and nylon cord in the exterior radial and belt plies. This results in a much superior tire than one constructed entirely of either of the above mentioned synthetic cords, since an overall approach to the above idealized tire carcass is realized in such a construction.

More importantly, the use of a polyamide in the belt plies eliminates sidewall radial cracks that occur under severe power application. In contrast to a belt of steel construction in this area, it is evident that this impovement can be primarily attributed to the higher impact energy absorption properties of nylon. In addition the great adhesive power and low bending stiffness of the nylon contributes to improved resistance to separation and improved traction capabilities. When further considering nylon, it follows that the exceptional bending life and large capacity to absorb impact energy makes this an outstanding belt textile.

Applicant's novel tire construction employs a combination of these known tire cords in novel arrangements wherein their outstanding properties are utilized while their poor or undesirable properties are minimized or hidden.

One of these novel constructions employs nylon cord in the belt construction wherein the nylon cord in addition to performing the main duty of a belt acts as a shock absorber to relieve stresses that currently result in the formation of radial sidewall cracks with the subsequent destruction of the tire. The combination of high impact energy coupled with lower modulus and greater flexibility results in an ideal shock absorber for high torque forces. In addition to relieving destructive radial forces in the sidewall such a tire containing nylon cord in the belt construction also results in a softer ride, less road noise, and better traction, particularly under conditions of high side thrust.

Another novel construction employs nylon cord in the radial as well as in the belt construction, thereby resulting in greatly enhanced resistance to radial sidewall crack formation, greatly improved traction characteristics along with a much softer ride and lower noise transmittal to the operating vehicle.

Another novel tire construction places the materials having high impact energy, high adhesive power, long or high bending life, low bending stiffness, and high moisture resistance in the outer radial plies; and places the materials having the low moisture resistance, low elongation under loads on the inside plies; with materials having properties or characteristics intermediate of these two extremities being placed in the center of, or between the inner and outer plies, when deemed desirable in the larger multi-ply tire.

Of the above materials, the polyamides are best suited for the outside ply material since its bending life far exceeds the others, and its impact energy and moisture resistance is highly satisfactory; hence, nylon is used in the below illustrative examples to exemplify an outside ply material having the above outlined desirable properties.

EXAMPLE 1

A tire comprised of two radial plies and four belt plies was designed having conventional steel construction in the radial plies and nylon as the principal textile in the four belt plies. Thus nylon replaces the steel cord in the belt ply of the tire, thereby tremendously increasing the adhesive strength, impact energy, and bending life as compared to steel. The elongation under load of the nylon compares very poorly with steel; however, since steel is retained as the cord material in the radical plies, there will be no appreciable growth or elongation of the belt and since the adhesive properties of nylon is three times that of steel, there is a lowered tendency towards ply separation; and since nylon possesses an impact energy roughly eight times greater than steel, the shock absorbing quality of such a nylon belt relieves the stresses developed in the buttress sidewall area that result in radial crack type failures; and a decided improvement in the noise level along with a reduction in harshness and an improvement in traction is realized.

EXAMPLE 2

This all textile radial tire design used a composite of materials to eliminate possible ply separation, to preclude sidewall radial cracking in the lower buttress area, and to prevent moisture deterioration in the rayon ply. Two radial plies of rayon and nylon supported a four ply belt made of nylon. The first or innermost radial ply was fabricated of a rayon tire cord material and the second or adjacent ply was of nylon. Thus the belt and its adjacent ply are of like material and form a moisture barrier for the rayon ply. This tire gave superior riding performance, had a relatively low permanent set, and improved roadability characteristics.

EXAMPLE 3

A polyester was substituted for the rayon in the preceeding Example No. 2, to give a tire having four belt plies of nylon, an outer or adjacent radial ply of nylon, and an innermost ply of polyester. This tire was not tested to destruction, but it was anticipated that the polyester would suffer chafing and interfilament separation under extreme test severity. The roadability of the tire was superior to example one above, but slightly less than that of the above Example 2.

EXAMPLE 4

A radial ply carcass using fiber glass plies supporting a nylon 66 belt ply was designed wherein three radial plies were employed. The fiber glass textile had been pretreated whereby each individual fiber of the ply was rubber coated to increase its adhesive power. The nylon of the belt was heat stretched and comprised three low angle plies, thus giving a slight structural imbalance or lack of symmetry to one side wall of the tire as compared to the other sidewall. This tire was designed to run on a rear engined vehicle where the tires are seldom perpendicular to the road. When fitted with a white sidewall, the same side will always be facing outward, where the uneven wear produced by the purposely imbalanced tire will offset the uneven wear caused by the lack of perpendicularity of the rear wheel.

It will now be evident that the overall characteristics of the radial tire construction using a multi-ply configuration will be related to and governed by the combination and choice of material used in both the radial and belt plies. The relationship of these elements must be of a ratio to first overcome the problem of buttress radial cracking and ply separation, followed by the desired tire strength, acceptable levels of riding comfort, vehicle handling characteristics, and an acceptably low tire growth. Thus it is evident that a tire can be fabricated having a minimum of a single ply and up to as many as fourteen plies with any number of belt plies to give a strength equivalent to as many plies as desired. In some aircraft tires the number of plies may even exceed this number.

Changes in and modifications of the construction described may be made without departing from the spirit of my invention or sacrificing its advantages.

Having thus described the invention, what is claimed and desired to be secured by Letters Patent is:

1. A pneumatic tire having a radial ply carcass which supports a number of belt plies, and a tread wearing composition disposed about the outer periphery of the belt plies;
   said belt plies being made of a polyamide as the principal reinforcing tire cord material;
   said carcass having steel as the principal reinforcing tire cord material;
   said belt plies being comprised of several adjacent low angle plies with the tire cord material of each adjacent ply forming an included angle of up to 20° with respect to one another; and
   said carcass includes two radial plies and said belt plies includes four adjacent low angle plies.

2. A pneumatic tire having a radial ply carcass which supports a belt of at least one belt ply, and a tread wearing composition disposed about the outer periphery of said belt;
   said ply of said belt being made of a polyamide as the principal reinforcing tire cord material;
   said carcass having fiber glass as the principal reinforcing tire cord material;
   said ply of said belt being made of cords forming a low angle of up to 10° with respect to the mid-circumferential plane of the tire; and
   said belt includes an odd number of plies whereby:
   the unsymmetrical feature of the tire brought about by the odd number of biased low angle belt plies is utilized to compensate for the unsymmetrical forces resulting when the tire is positioned on a rear wheel or a rear engine type vehicle wherein the rear wheel normally forms an acute angle with respect to the ground.

3. The tire of claim 2 wherein said belt is comprised of three biased plies, with the first and third belt plies being biased in a direction opposite to that of the second belt ply.

4. The tire of claim 2 wherein said carcass plies are fabricated using two fiber glass tire cord plies, and said belt includes three oppositely biased low angle plies with each adjacent ply forming an included angle of up to 20° with respect to each other.

5. The tire of claim 2 wherein means forming indicia is placed on one side of the sidewall of the tire to enable identification to be made of the location of the unsymmetrical characteristics of the tire and to enable the tire to be properly positioned upon a rearwardly located wheel of a rear engine type vehicle to thereby maintain the unsymmetrical feature of the tire properly positioned with respect to the relationship of the rear wheel and to the ground which supports the tire.

6. The tire of claim 2 wherein said belt is comprised of a single ply.

7. The tire of claim 2 wherein said carcass includes at least one radial ply, and said belt includes at least one belt ply.

8. The tire of claim 2 wherein said carcass includes a multiplicity of radial plies, and said belt includes an uneven number of a multiplicity of plies.

References Cited

UNITED STATES PATENTS

| | | | |
|---|---|---|---|
| 2,224,274 | 12/1940 | Powers | 152—359 |
| 2,498,859 | 2/1950 | Lessig | 152—355 |
| 2,990,870 | 7/1961 | Vittorelli | 152—356 |

FOREIGN PATENTS

| | | |
|---|---|---|
| 851,898 | 10/1960 | Great Britain. |

ARTHUR L. LA POINT, Primary Examiner

U.S. Cl. X.R.

152—362